May 15, 1956

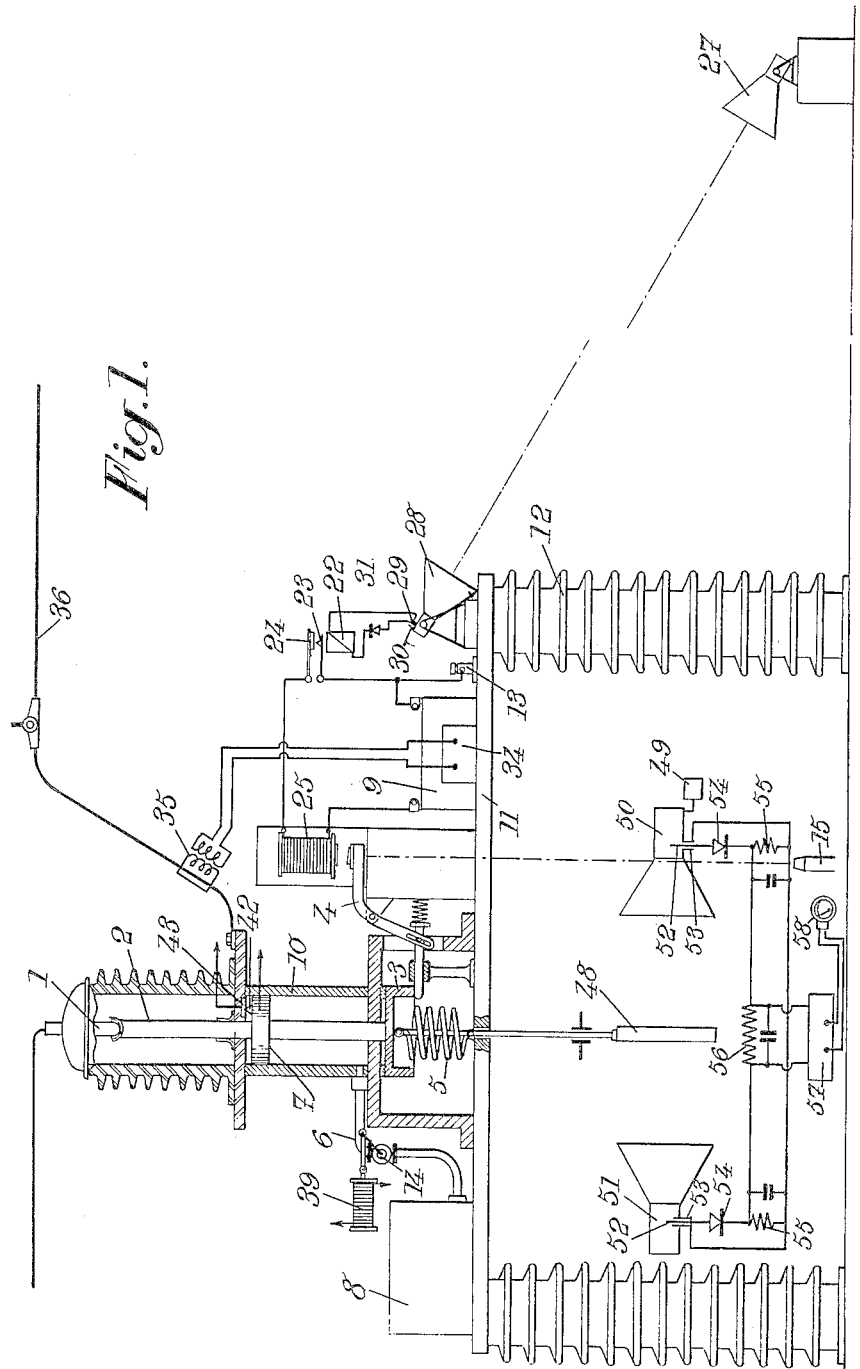

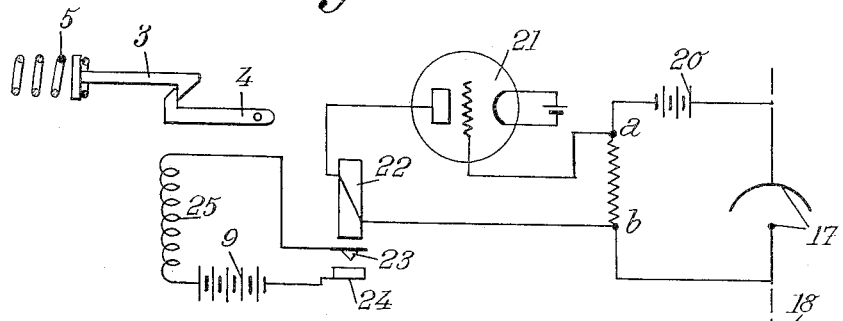
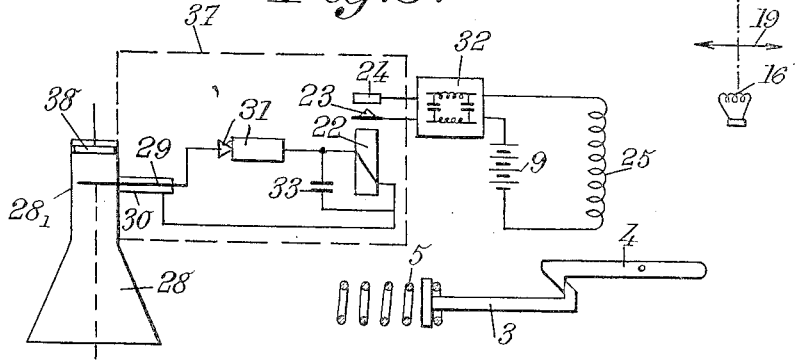
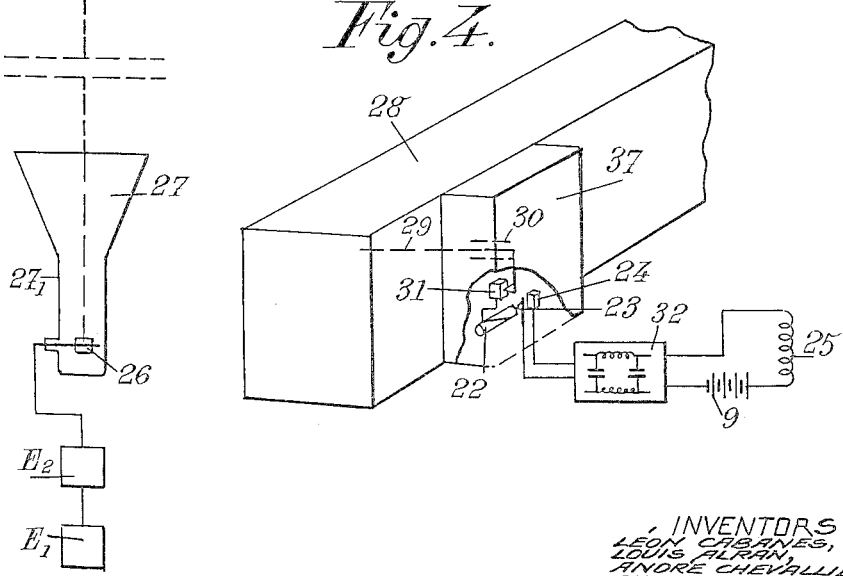

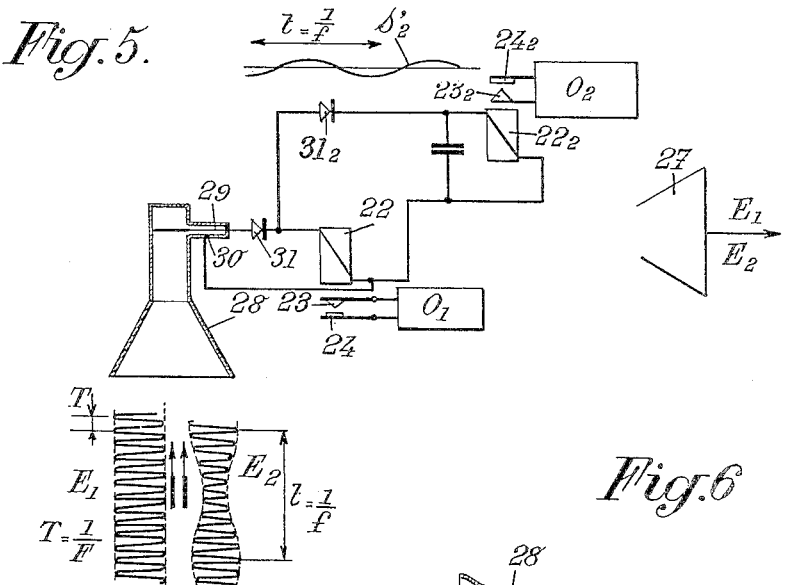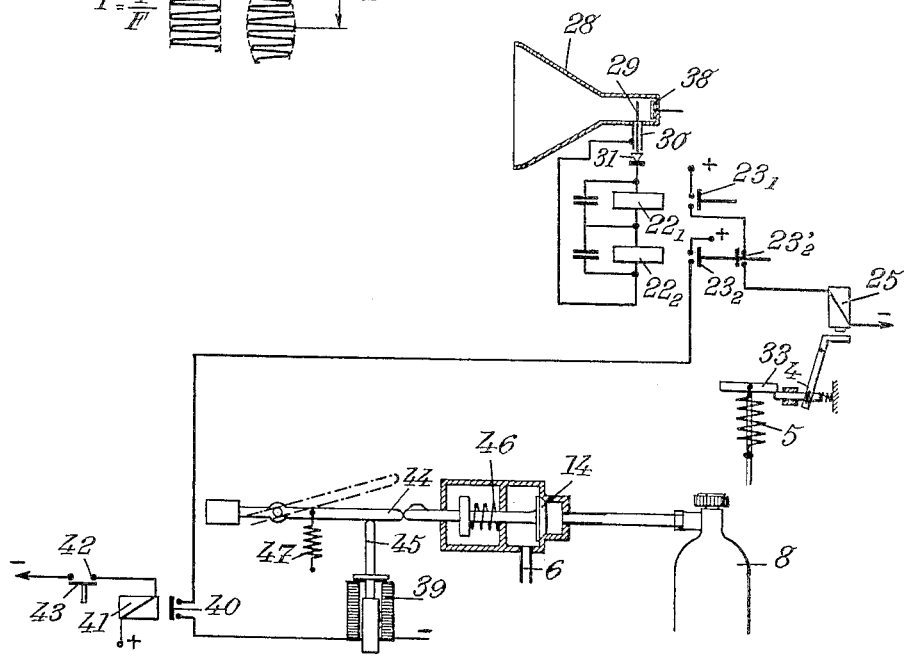

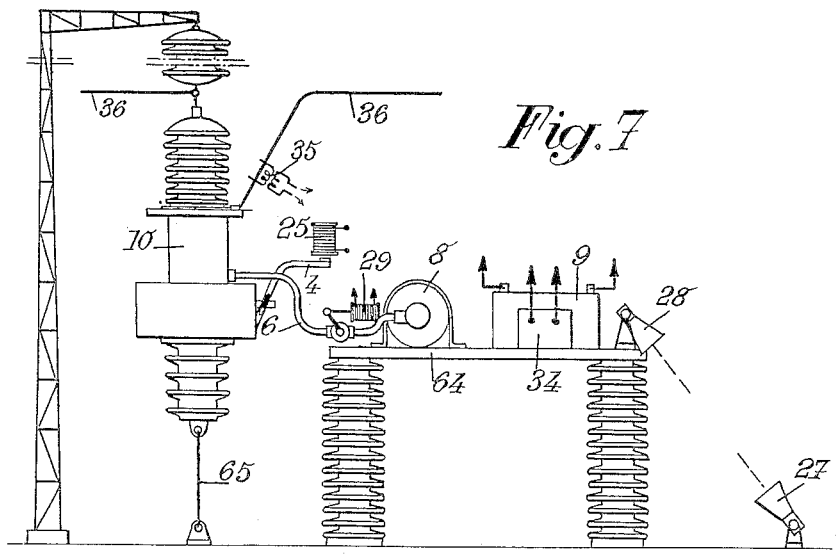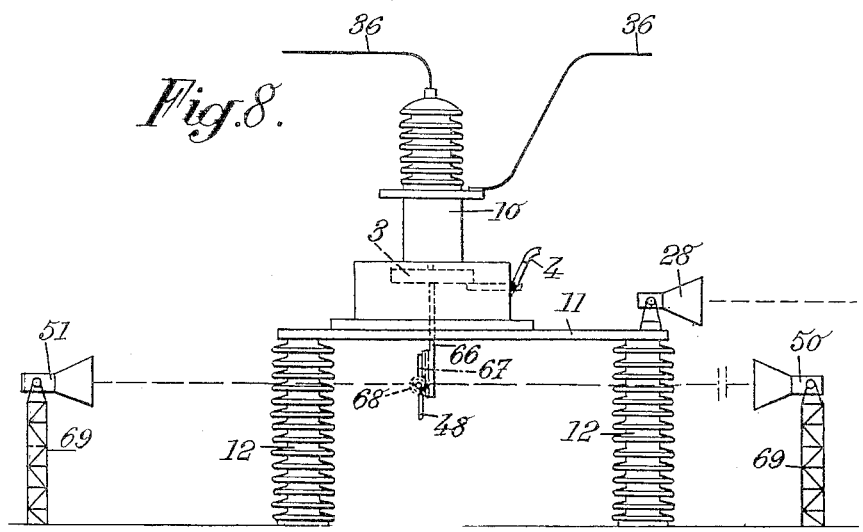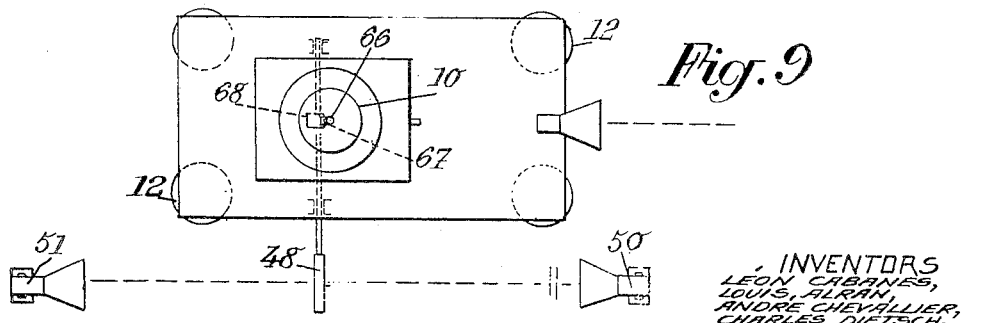

L. CABANES ET AL 2,745,952

DEVICES FOR OPERATING AND CONTROLLING
HIGH TENSION ELECTRICAL APPARATUS

Original Filed Dec. 22, 1948

INVENTORS
LEON CABANES,
LOUIS ALRAN,
ANDRÉ CHEVALLIER,
CHARLES DIETSCH,
BY MAURICE PAINBOEUF,

Roberts B Larson ATTORNEY

United States Patent Office 2,745,952
Patented May 15, 1956

2,745,952

DEVICES FOR OPERATING AND CONTROLLING HIGH TENSION ELECTRICAL APPARATUS

Leon Cabanes, Louis Alran, Andre Chevallier, and Charles Dietsch, Paris, and Maurice Painboeuf, Sceaux, France, assignors to Electricite de France Service National, Paris (Seine), France, a society of France Continuation of abandoned application Serial No. 66,818, December 22, 1948. This application July 16, 1954, Serial No. 443,932

Claims priority, application France October 23, 1948

4 Claims. (Cl. 250—2)

The present invention relates to devises for operating and controlling high tension electrical circuitbreakers, or equivalent switch apparatus.

Up to now, the movable parts of these apparatus, carried by insulating supports at a suitable height above the ground (to achieve the required insulation), were actuated through servo-motor means located on the ground, i. e. at a substantial distance from said apparatus, and insulating mechanical transmissions were to be interposed between said apparatus and their servo-motors. These transmissions constitute a source of considerable difficulties. First of all they are subject to repeated mechanical stresses while the insulating materials of which they are made are poorly adapted to support such stresses. On the other hand their presence gives rise to an important inertia, which tends to limit the speed at which the apparatus are set and released. If high speeds of operation are desired, it is necessary to reinforce the transmission means and to make use of relatively complicated mechanisms.

The object of our invention is to provide a device of the type above mentioned which is free from these drawbacks.

For this purpose, according to our invention, instead, as usual up to the present time, of disposing on the ground the source of energy (pneumatic, mechanical, electric, etc.) and the servo-motor means operated by the energy of said source and of interposing between said servo-motor means and the apparatus to be controlled (located on an insulating platform), transmission means which must necessarily be insulating means, we place the source of energy and the servo-motor means in immediate proximity to the apparatus to be controlled (in this case to the circuit-breaker), therefore either upon the insulating platform intended to support it or upon an insulating platform close to this apparatus, and we provide, to control from the ground or anyway from a distance the operation of said servo-motor means, means devoid of any mechanical connection between the ground and the platform.

It is pointed out that, prior to our invention, the fact of placing on an insulated support above the ground the servo-motor means of a high tension switch apparatus and the source of energy for operating said servo-motor means was considered, by experts in the art, as impossible in practice, chiefly because of the weight and complication of said elements. But, with an arrangement according to our invention, said servo-motor means and source of energy can be so simplified and made of lighter weight, owing to their proximity to the switch apparatus, that the thing then becomes possible.

Preferred embodiments of the present invention will be hereinafter described with reference to the accompanying drawings, given merely by way of example and in which:

Fig. 1 is a diagrammatical view of a circuitbreaker for very high voltage circuits operated by means of a device according to our invention;

Fig. 2 diagrammatically shows an optical control device included in an apparatus of this kind, according to an embodiment of our invention;

Fig. 3 diagrammatically shows an ultra-short wave electronic control device for an apparatus of this kind, made according to another embodiment of our invention;

Fig. 4 shows, in diagrammatic perspective view on an enlarged scale, a portion of the receiver included in said device;

Fig. 5 diagrammatically shows a receiver for controlling two kinds of operations (release and resetting);

Fig. 6 diagrammatically shows a device of the same kind made according to another embodiment;

Fig. 7 diagrammatically shows a circuit-breaker for very high tensions, of the hanging type, made according to still another embodiment of the invention;

Figs. 8 and 9 respectively show in diagrammatic elevation and plan view on a smaller scale, a signalling device for a circuit-breaker made according to an embodiment distinct from that of Fig. 1;

Figure 12:
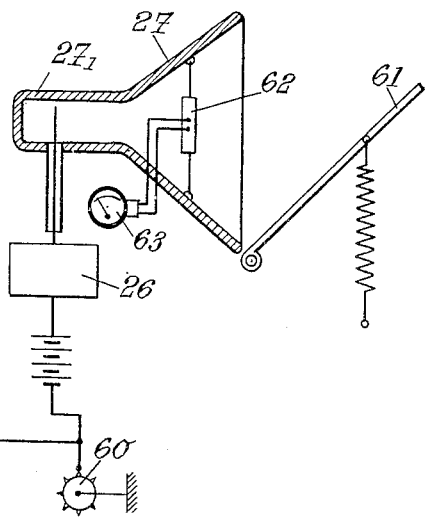

Finally, Fig. 12 shows some constructional details of the invention.

In the following description, the invention will be supposed, by way of example, to be applied to circuit-breakers.

Concerning the circuit-breaker proper, it may be of any suitable construction, it being understood that it may be of the simple or multiple contact type and that, supposing that it includes at least two contacts, such as 1 and 2 (Fig. 1), one of which is stationary and the other movable, the displacement of the movable contact can be obtained through any suitable source of energy, in particular a mechanical and/or a pneumatic one.

Concerning more especially the tripping of the movable contact, it may be obtained in different ways, for instance: by the release of suitable locking parts such as 3, 4 (Fig. 1), the movable contact then returning to its initial position under the action of at least one spring 5 previously tensioned during the resetting movement, said spring being for instance subjected to tension stresses (as shown); or by a pneumatic action controlled by at least one suitable valve.

Similarly, resetting may be produced through a pneumatic, mechanic, electric or other action, Fig. 1 showing a device according to which compressed air arrives for this purpose at 6 under piston 7.

A compressed air reservoir 8, when pneumatic servo-motor means are used, and/or an electric electromotor 25 with its battery 9 or other source of current, when electric servo-motor means are used, is mounted close to the circuit-breaker 10 (Fig. 1), on an insulating platform 11 separated from the ground, in the known manner, through insulating pillars 12 or the like. These sources of energy (reservoir, battery, etc.) will thus be at the same high tension as movable contact 2, same as platform 11. Fig. 1 shows that one of the terminals of battery 9 is at the potential of the platform, at 13.

Reservoir 8 might be constituted by a removable bottle, of sufficient volume to supply air for a great number of operations (50 or 100 for instance). The high pressure air contained in this bottle will be distributed to the operating piston or pistons either directly or through the intermediate of a pressure relief device lowering the pressure down to 4 or 5 kgs., for instance. Resetting or release of the circuit breaker will therefore consist in operating from a distance, that is to say from the ground, the working of an electro-valve such as 14 (Fig. 1) and/or of mechanical unlocking means such as 3, 4.

A spring 5 interposed between platform 11 and the rod which carries contact 2 tends to pull said rod downwardly. This downward motion is prevented by a kind of bolt 4a slidable horizontally with respect to the platform and engaging under the edge of an annular member 3 rigid with the rod which carries contact 2. A bell crank lever 4 acts through a pin and slot connection on bolt 4a to retract it toward the right when the top portion of lever 4 is pulled upwardly by electromagnet 25. Resetting takes place through the temporary opening of electro-valve 14. Exhaust of air, after expansion, has not been illustrated, in order to avoid unnecessarily complication of the drawing.

Instead of mounting the circuit breaker and the power sources on a common insulating platform 11 (Fig. 1), we might also mount said sources or some of them on a distinct platform 64, as shown by Fig. 7. As shown by this view, reservoir 8, battery 9, etc., are carried by this platform 64, whereas circuit-breaker 10 is supposed to be hanging from line 36, i. e. from a tower, anchoring being provided at 65. Conduit 6 is of course of sufficient flexibility.

Concerning now the means for exerting said control from a distance, from the ground, without intervention of a permanent, mechanical and insulating connection, it seems advantageous to make use of electromagnetic waves, it being understood that this term must be taken in all its generality and include, in particular: optical rays, infra-red rays or other rays close to the spectrum of light, and electromagnetic waves, preferably ultra-short waves and microwaves.

It will then be possible to use any lay-outs known in the art of telecontrol, with: on the one hand, at the ground, transmitting means capable of transmitting radiations preferably with two distinct characteristics (for instance concerning frequency, amplitude, modulation, etc.), corresponding to at least two kinds of movements to be obtained for the circuit-breaker (resetting and release), and, on the other hand, on the platform (11, Fig. 11, or 64 Fig. 7), receiver means capable of cooperating with the transmitting means to control, either directly or through suitable relays, the unlocking means, valves, etc., to ensure release and resetting.

But our invention is not to be considered as limited to the use of these electromagnetic control means. Thus the resetting or release order, either delivered on the spot or received from a distance might cause, on the ground, a projectile to be shot (by means of a gun 15, Fig. 1, etc.), which projectile will be received, on the platform, by a receiver apparatus for operating the servo-motor means. This projectile might, for release purposes, merely come to strike pawl 4 and thus produce its release. Such means may besides, eventually, be used as emergency means, in combination with the above specified electronic controls.

In Fig. 2, we have shown a system making use of optical rays, which system essentially includes, on the one hand, a light source 16 located on the ground (or on a pillar at a suitable distance from platform 11), and, on the other hand, a photo-electric cell 17 disposed on the platform, with means 18, 19 for concentrating light rays thereon.

Impact of the light rays upon this cell has for its effect to create a voltage or voltage variation across the terminals $a$, $b$ of a resistance 16 provided in the circuit of an electric battery 20 and of cell 17. This voltage, amplified by at least one electronic tube 21, is used for operating a relay 22, which in turn brings into play, through contacts 23, 24, a coil 25 supplied with current from battery 9 and capable of acting upon unlocking pawl 4 (or any other element for starting electro-motor means such as a compressed air valve, an electric motor, etc.).

In Fig. 2, we have considered only the case of a single element to be controlled, in this case the unlocking pawl for release of the circuit-breaker. As a rule, it will be necessary to obtain at least two operations (release and resetting), that is to say to provide at least two servo-motor means. For this purpose, it will suffice for instance to provide two systems of the kind of that of Fig. 2, or, better, a single system of this kind but with two transmissions of light differing from each other by their amplitude or by their rate of impulses (if use is made of light impulses) or in any other way, these two transmissions being differentiated from each other upon reception in such manner as to be able to act respectively upon said two servo-motor means.

It will be necessary, in this embodiment, to provide means for screening the electric circuits so as to avoid as far as possible the influence upon said circuits of the shock waves received when the circuit-breakers associated with the line are opened, or due to the effect of thunder, etc.

It seems more advantageous to ensure the desired transmission through the use of radio-electric waves and, in particular, microwaves, for instance decimetric or centimetric waves.

As a matter of fact, these waves permit a perfect screening of the circuits, permit of dispensing with amplification such as that obtained by means of tube 21 of Fig. 2 and, finally, are practically proof against the effects of shock waves, since the frequency of centimetric waves averages 3000 megacycles (for 1 equal to 10 cms.) whereas the wave front of shock waves corresponds to a time much longer than the period corresponding to the wave that is transmitted. Furthermore, they enjoy remarkable directional properties, which eliminate any loss of radiating energy between transmission and reception.

Fig. 3 shows one of the lay-outs which can be used for such ultra-short waves.

This lay-out includes, on the ground, a transmitting device $E_1$, $E_2$ acting upon a magnetron 26 or any other similar generator (klystron, high frequency triode, etc.), signs $E_1$, $E_2$ being intended to indicate that the set can transmit with at least two different characteristics, for two (or more) kinds of operations to be performed.

For one of these operations ($E_1$) we use for instance the transmission of a pulse of a sufficient duration for releasing the circuit-breaker, whereas, for the other operation ($E_2$), we use either pulses at a suitable rate, in particular a musical one, or of different amplitudes and/or durations, or a modulated transmission, as will be explicited with reference to Figs. 5 and 6.

At the reception end, that is to say on the platform, means are provided for receiving and detecting these transmissions of different characteristics, and for thus generating currents or voltages capable of acting respectively upon the servo-motor means to be controlled.

Fig. 3 shows one of the lay-outs that can be used for receiving a given transmission and controlling the corresponding element or elements, for instance release pawl 4.

The waves issuing, on the transmission side, from horn 27 associated with a wave-guide $27_1$, are received in a horn 28 associated with a wave-guide $28_1$, on which is mounted a coaxial cavity 29, 30 (with a tuning adjustment piston at 38). Between the two elements of this coaxial cavity is inserted the receiver circuit, which comprises on the one hand a rectifier cell 31, of a type used for these ultra-high frequency currents (this cell including for instance semi-conductor bodies such as silicium, germanium, copper oxide, etc.) and, on the other hand, a relay 22 acting in the same manner of that of Fig. 2 for controlling pawl 4 through coil 25. A filter arrangement is advantageously provided for stopping the undesirable waves which might enter box 37 through the wires associated with contacts 23, 24 and therefore for stopping, in particular, the shock waves produced when the contacts of the circuit-breaker are moved apart, or for stopping the above mentioned parasitic waves (which might react upon rectifier 31 and modify the characteristics thereof). Relay 22 is preferably shunted by a condenser 33.

It will be seen that this arrangement does not require any feed source other than battery 9, the charging of which may be constantly ensured by a charger 34 fed with current at 35 from line 36 (Figs. 1 and 7). Relay 22 is directly controlled through rectifier 31.

Besides it should be noted that battery 9 might be dispensed with, if the current supplied by rectifier 31 were sufficiently important, the initial power being itself calculated in consequence. As a matter of fact it is possible to provide rectifiers complying with these conditions, in particular through the association in series-parallel connection of suitable semi-conductor bodies.

Finally, the wave guide and the coaxial cavity permit of ensuring a screening, it being however understood that a supplementary screening may be provided at 37. This supplementary screening is shown by Fig. 4, in the form of a lateral box 37 which contains the various elements 31, 22, 23, 24. Parasitic oscillations are without any effect upon this arrangement which ensures, under a small volume, a perfect safety.

In order to enable a system of this kind to react differently to two different wave transmissions $E_1$, $E_2$, and thus respectively to control the two servo-motor means $O_1$ and $O_2$ (Fig. 5) (in particular for releasing and resetting the circuit-breaker), we may use different arrangements.

If it is supposed for instance that transmission $E_1$ gives rise to a pure wave of decimetric or centimetric frequency $F$ and that transmission $E_2$ gives rise to a wave modulated at a frequency $f$, the desired result will be obtained by connecting the output of the coaxial cavity: on the one hand with the same devices as above mentioned, to wit rectifier 31 and relay 22, for controlling the release servo-motor means $O_1$ (Fig. 5), and, on the other hand, with a set of the same kind, to wit including rectifier $31_2$ and relay $22_2$, for controlling the resetting servo-motor means $O_2$.

The second rectifier $31_2$ is connected to the output of the first rectifier 31, in such manner that it can detect, in the case of a transmission wave $E_2$, the current $s'_2$ already detected by 31 and which has only a frequency $f$. It will be seen that it does not respond to transmission waves $E_1$, since in this case there is no modulation frequency $f$.

A suitable device is provided for making relay 22 irresponsive to current $s'_2$ in the case of a transmission wave $E_2$.

Fig. 6 shows another embodiment, according to which signal $E_1$, intended to cause the circuit-breaker to be released, is a continuous signal of ultra-high frequency $F$, and signal $E_2$ is a discontinuous signal pulsed at a musical or other frequency $f$.

According to this embodiment, we make use of a single rectifier 31 and two relays, for instance in series $22_1$, $22_2$, corresponding respectively to release and resetting.

Relay $22_1$ acts upon contact $23_1$ for closing the circuit of coil 25, as above and to release the circuit-breaker by means of pawl 4.

Relay $22_2$ is tuned to the musical frequency $f$ and is therefore operated only by signal $E_2$. It closes, at $23_2$, the circuit of a coil 39 acting upon valve 14 provided on the compressed air inlet conduit 6 (Figs. 1 and 6). Said relay $22_2$ further opens at $23'_2$ the circuit of coil 25 during the resetting operation.

In order to permit of stopping the feed of compressed air as soon as resetting has been obtained, we provide for instance, in the circuit of coil 39, a contact 40 which opens, under the action of a relay 41, as soon as piston 7 has reached the end of the resetting displacement, this relay 41 being controlled for instance through contact 42, 43 (Fig. 1).

Fig. 6 shows valve 14 in the closed position. An incoming signal $E_2$ causes arm 44 to be moved by the core of coil 39 out of the way of the stem of valve 14, said valve opening then under the action of spring 46. Piston 7 is pushed upwardly and, at the end of its displacement, causes the current of coil 39 to be cut off at 40. Arm 39 then comes back in position under the effect of a spring 47 and again closes valve 14.

It should now be noted that the above mentioned ultra-short waves, and in a general manner electro-magnetic or other means as above mentioned, might be used not for controlling mechanisms but for supervising the operation of the apparatus, in particular for producing at a distance: either signals of the hit and miss type, that is to say indicating whether the circuit-breaker (or any other apparatus) is in closed or released position, or continuous signals giving at any time the exact position of the part or apparatus to be supervised.

We have shown, on Fig. 1, a signalling device including for instance a shutter 48 the movement of which (which is supposed to be a translatory one, but might be different, for instance a rotary one) is linked with that of the movable element of the circuit-breaker, which shutter is adapted to stop a beam—in particular of ultra-short waves—travelling from a transmitting device 49 or a wave guide 50 toward a receiving device 51.

The displacement of shutter 48 produces relative voltage variations in suitable devices, which variations depend upon the intensity of the beam respectively before and after it is stopped by the shutter. These devices are for instance each constituted by a coaxial cavity 52, 53 cooperating with a circuit including a rectifier 54 and a load resistor 55. The voltages in the two resistors 55 are compared at the terminals of a common resistor 56, in a comparator 57, the comparison term then appearing in a pointer apparatus or a signalling tube 58.

Figs. 8 and 9 illustrate, in a less diagrammatic manner, an embodiment according to which shutter 48 is controlled by a rod 66 movable together with the movable part of the circuit-breaker, with the interposition of a kinematic device such as a rack 67 and a pinion 68. The shutter is thus caused to rotate about the axis of pinion 68 so as to be brought into a position at right angles to the direction of the beam to be stopped. The wave guide devices 50, 51, which may be at the potential of the ground, are then supported by towers 69 located at a suitable distance from the circuit-breaker and its control means.

Figure 10:
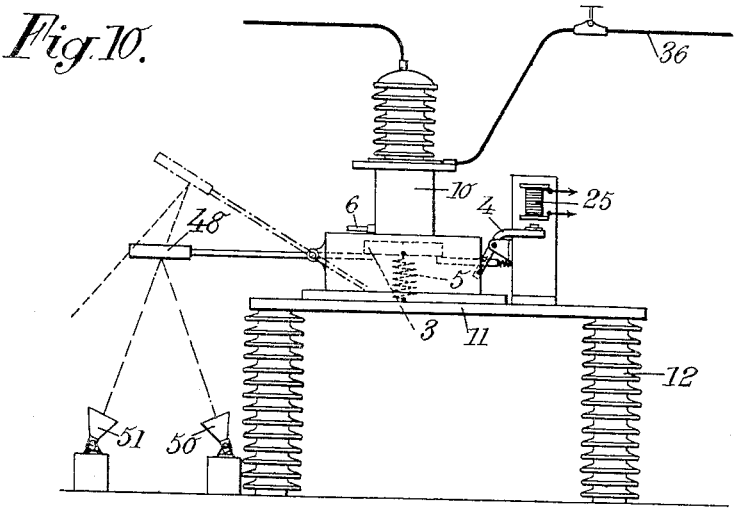
Fig. 10 is an elevation view of such a device, according to another embodiment.

Fig. 10 illustrates another embodiment in which shutter 48 is movable with a pivoting movement and ensures reflection of the beam transmitted at 50 and received at 51. This last arrangement acts for instance in a hit and miss fashion, for switching on or off a signalling lamp.

It should be noted that these signalling means may advantageously be used for resetting purposes, when this resetting is to take place automatically, in combination with protection apparatus. It suffices, for this purpose, to combine with the signalling device contacts capable of automatically operating the resetting, as soon as the protection apparatus make it possible.

It goes without saying that, in the case of polyphase lines, in particular three-phase lines, we provide in each phase a circuit breaking device of the kind of that above specified. Automatic release and resetting can take place independently in each phase, owing to the means according to our invention, each pole of the circuit-breaker being capable of working on its own account independently of the two others.

It may be interesting, when there is provided, by way of emergency, a release device making use of a gun 15 (Fig. 1), to combine therewith the signalling device, in order to bring into play the emergency release device when the signalling device indicates that operation by means of the electro-magnetic waves control means has failed to work. Besides, it is understood that a gun or similar control might also be provided for resetting.

Figure 11:
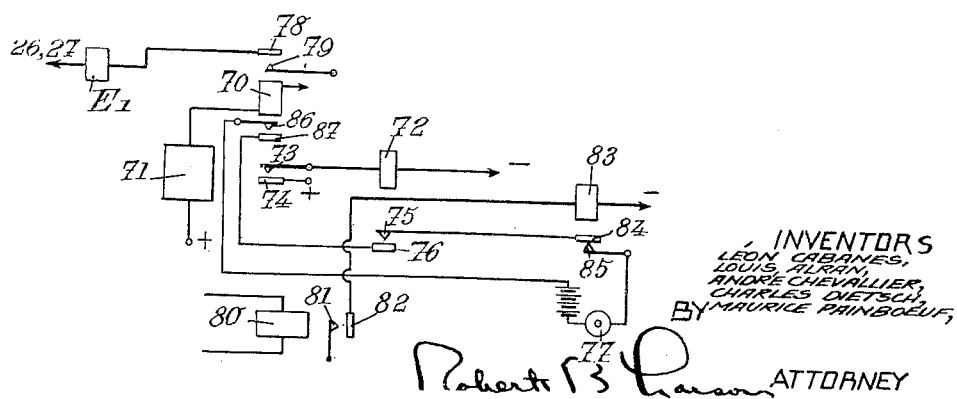
Fig. 11 is a diagram illustrating a safety device cooperating with the above mentioned signalling device.

Fig. 11 shows a lay-out which can be used for this use of said two devices.

This view shows: at 70 the last relay of the protection system 71 of the plant, therefore the relay intended to give, through contact 78, 79, the release order through transmission $E_1$ toward device 26, 27 of Fig. 1 (or another transmission device); at 72, a suitable time lag relay, the closing of which is controlled by the preceding relay 70 (contacts 73, 74), said relay 72 itself controlling contacts 75, 76, interposed in the circuit of a device 77 for the operation of gun 15 (a cartridge, for instance); and at 80 a relay controlled by signalling device 57 and capable, when operated, of controlling, through its contacts 81, 82, which bring into play another relay 84, the opening of said circuit at 83, 85.

The device works as follows. Operation of protection relay 70 has for its effect, on the one hand, to transmit wave signal $E_1$ and, on the other hand, to prepare the circuit of device 77, contacts 86, 87 being closed. At the same time, it closes at 73, 74 the circuit of relay 72, which itself closes contact 75, 76, but only after a suitable delay. At this time, if the plant works normally, signal $E_1$ must have produced release, whereby the signalling device must have itself sent a signal toward relay 80 which, through relay 83, opens contacts 84, 85; the circuit of device 77 can therefore not operate. If, on the contrary, the circuit-breaker has not worked, no signal reaches relay 80 so that contacts 84, 85 remain closed; cartridge 77 then explodes as soon as contact 75, 76 is closed by time lag relay 72 and gun 15 (Fig. 1) is brought into action.

Still by way of indication, we have finally illustrated on Fig. 12 a short-wave transmitter to be used according to the invention.

The horn and the wave guide are shown at 27, $27_1$, as on Figs. 1 and 3. The high frequency generator is shown at 26; signal $E_1$ is transmitted as a result of the closing of contact 59, and the musical frequency signal $E_2$ through device 60. A device for checking up the operation of the plant may be provided, this device consisting for instance of a shutter 61 and a thermosensitive element 62. When it is desired to check up the operation, shutter 61 is closed: the thermosensitive element gives an indication, at 63, only if there is a transmission.

Preferably, the horn, such as 27, is to have rounded edges, in order to reduce the effluves resulting from the fact that the horn is brought to the potential of the line.

It goes without saying that horns might be replaced by parabolic mirrors.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

This application is a continuation of our application Ser. No. 66,818, now abandoned.

What we claim is:

1. In combination with a high tension electrical apparatus insulated from the ground and having at least one movable switch means adapted to occupy either of two different positions, the improvement which comprises, servo-motor means for actuating said movable switch means mechanically interconnected therewith irrespective of electrical insulation therefrom, wireless wave energy means for operating said servo-motor means from a distance, means producing a wireless wave transmission between points at least one of which is at a distance from said apparatus for indicating the position of said switch means, means operative by said movable switch means for blocking said transmission for one of said two positions of said switch means, emergency means for operating said servo-motor means, and means operative by said wireless wave transmission for operating said emergency control means in case of failure of said first mentioned wave energy means to operate said servo-motor means.

2. In combination with a high tension electrical apparatus insulated from the ground and having at least one movable switch means adapted to occupy either of two different positions, the improvement which comprises, servo-motor means for actuating said movable switch means mechanically interconnected therewith irrespective of electrical insulation therefrom, wireless wave energy means for operating said servo-motor means to open and close said switch means from a distance, means producing a wireless wave transmission between points at least one of which is at a distance from said apparatus, means operative by said movable switch means for blocking said transmission for one of said two positions of said switch means, emergency control means for operating said servo-motor means, time lag relay means for operating said emergency means in response to the opening of said switch means by said first mentioned wave energy means, and means operative by said wireless transmission for bringing said emergency control means out of action before operation of said relay in case of normal operation of said first mentioned wave energy means.

3. A device according to claim 2, in which said emergency control means are constituted by a projectile fired from a distance.

4. In combination, a tower, a high tension line supported by said tower and insulated therefrom, a platform suspended from said tower, a switch apparatus supported on said platform, said switch apparatus including two parts movable with respect to each other and adapted to occupy either of two relative positions corresponding to switching on or off the passage of current through said line, motor means located immediately adjacent said switch apparatus and mechanically interconnected therewith for moving said parts relatively to each other, a source of energy located adjacent said motor means for operation thereof, said motor means and said source of energy being insulated from the ground and being disposed at substantially the same height above the ground as said switch apparatus, and means operative from the ground for controlling said motor means.

References Cited in the file of this patent

UNITED STATES PATENTS

| | | |
|---|---|---|
| 2,057,472 | Bonds | Oct. 13, 1936 |
| 2,301,765 | Wilkins | Nov. 10, 1942 |
| 2,446,279 | Hammond | Aug. 3, 1948 |
| 2,522,893 | Purington | Sept. 19, 1950 |
| 2,594,247 | Thibaudat | Apr. 22, 1952 |